United States Patent
McHale et al.

(10) Patent No.: US 10,449,453 B2
(45) Date of Patent: Oct. 22, 2019

(54) THIRD PERSON CAMERA AND AVATAR MOTION CONTROLLER FOR VIRTUAL REALITY PLAYERS OF AVATAR-BASED GAMES

(71) Applicants: Michael McHale, San Mateo, CA (US); Claus Christopher Moberg, Redwood City, CA (US); Kyle Emmerich, Union City, CA (US)

(72) Inventors: Michael McHale, San Mateo, CA (US); Claus Christopher Moberg, Redwood City, CA (US); Kyle Emmerich, Union City, CA (US)

(73) Assignee: Robolox Corporation, San Mateo, CA (US)

( * ) Notice: Subject to any disclaimer, the term of this patent is extended or adjusted under 35 U.S.C. 154(b) by 32 days.

(21) Appl. No.: 15/453,097

(22) Filed: Mar. 8, 2017

(65) Prior Publication Data
US 2018/0256976 A1 Sep. 13, 2018

(51) Int. Cl.
*A63F 13/5258* (2014.01)
*A63F 13/525* (2014.01)
*A63F 13/211* (2014.01)
*A63F 13/24* (2014.01)
*A63F 13/426* (2014.01)
*A63F 13/22* (2014.01)
(Continued)

(52) U.S. Cl.
CPC .......... *A63F 13/525* (2014.09); *A63F 13/211* (2014.09); *A63F 13/22* (2014.09); *A63F 13/24* (2014.09); *A63F 13/426* (2014.09); *G06F 3/013* (2013.01); *G06F 3/04815* (2013.01); *A63F 2300/8082* (2013.01)

(58) Field of Classification Search
CPC ............... A63F 13/525; A63F 13/5252; A63F 13/5255; A63F 13/5258
See application file for complete search history.

(56) References Cited

U.S. PATENT DOCUMENTS

| | | | | |
|---|---|---|---|---|
| 6,947,044 B1 * | 9/2005 | Kulas | ...................... | G06T 13/00 345/427 |
| 8,704,768 B2 * | 4/2014 | Juen | ........................ | G06F 3/033 178/18.01 |
| 2017/0160815 A1 * | 6/2017 | Glazier | ................... | G06F 3/013 |

OTHER PUBLICATIONS

VRChat "Introducing Holoport" Locomotion, posted Jul. 28, 2016.*
(Continued)

*Primary Examiner* — David L Lewis
*Assistant Examiner* — Ross A Williams
(74) *Attorney, Agent, or Firm* — Donald R. Boys; Central Coast Patent Agency LLC

(57) ABSTRACT

A virtual reality (VR) gaming platform has a head-mounted display (HMD), software executing on a processor, controlling display of a virtual environment in the HMD and providing functions for network connectivity via a digital port, a three-axis input device providing input to the processor, and dedicated control scripts executable on the processor to provide specific functions in moving an avatar and establishing camera position. The control scripts operate during game play to move the avatar from a first position to a second position in response to specific directional input from the player via the three-axis input device, the camera remains stationary while the avatar moves, and when the avatar stops moving, the camera position teleports to at or near the new avatar position.

26 Claims, 5 Drawing Sheets

(51) Int. Cl.
  *G06F 3/01*     (2006.01)
  *G06F 3/0481*   (2013.01)

(56) References Cited

OTHER PUBLICATIONS

"Locomotion in VR: Overview of different locomotion methods on HTC Vive", Posted Jun. 17, 2016, by Bumble, https://www.youtube.com/watch?v=p0YxzgQG2-E.*
Chronos VR Review, IGN VR, posted Apr. 15, 2016 https://www.youtube.com/watch?v=bMCAQ7FXYWY (Year: 2016).*
"Chronos Video Review" UploadVR, Mar. 28, 2016, https://www.youtube.com/watch?v=e9CdqmCO1xA (Year: 2016).*
"Chronos Review", by VR Source, Jun. 12, 2016, https://www.youtube.com/watch?v=vbToVUwxQfA (Year: 2016).*
"Chronos Review", by Alanah Pearce, posted on Apr. 14, 2016, https://www.ign.com/articles/2016/04/14/chronos-review (Year: 2016).*

* cited by examiner

THIRD PERSON CAMERA AND AVATAR MOTION CONTROLLER FOR VIRTUAL REALITY PLAYERS OF AVATAR-BASED GAMES

BACKGROUND OF THE INVENTION

1. Field of the Invention

The present invention is in the field of Virtual Reality (VR) media, including three-dimensional games and environments, and pertains more particularly to methods and apparatus for controlling motion relative to an avatar and an associated third person camera for a VR player.

2. Discussion of the State of the Art

In the field of Internet VR gaming and media, a player may interact with VR content using a trackable visual enhancement system, such as a head-mounted-display (HMD) VR monitor. Such VR systems include those provided by Google Cardboard™ Oculus Rift™, Samsung Gear, and others. VR is now being used on more and more platforms. Many existing and newly developed three-dimensional games and environments include Avatars that may represent a character a player selects to represent the player in the game or environment. In these games or environments, a player typically becomes or is associated with a particular Avatar, and a camera control scheme is associated with the Avatar, such that the Avatar may be observed by the player, as the avatar moves through the environment.

It is known to the inventor that VR is now available on an increasing number of devices, and that games and environments may now be accessed by both VR-equipped players, and players that are not equipped with VR hardware and software. Amongst other things it is desired that all players with VR platforms, and those not using VR accessing a same game session or environment that supports VR, have a good experience and a relatively equal and fair playing field. In VR, players typically teleport while others not using VR typically walk, run, fly, or exhibit a tracked motion that is followed by a camera. If a camera is disassociated with a VR player's head the VR player may quickly become disoriented and nauseous, similar to a sea-sickness or motion-sickness experience.

Therefore, what is clearly needed is a custom camera control schema and method of implementation during session engagement for users operating in VR mode in an Avatar-based game or environment, where the camera control schema is customized for specific device controllers and may be dynamically selected over a default control schema.

BRIEF SUMMARY OF THE INVENTION

In an embodiment of the invention a virtual reality (VR) gaming platform is provided, comprising a head-mounted display (HMD), software executing on a processor, controlling display of a virtual environment in the HMD and providing functions for network connectivity via a digital port, a three-axis input device providing input to the processor, and dedicated control scripts executable on the processor to provide specific functions in moving an avatar and establishing camera position. The control scripts operate during game play to move the avatar from a first position to a second position in response to specific directional input from the player via the three-axis input device, the camera remains stationary while the avatar moves, and when the avatar stops moving, the camera position teleports to at or near the new avatar position.

In one embodiment, the specific directional input comprises a persistent engagement of a thumbstick, joystick or button of a D-pad, as the three-axis input device, during which the avatar moves, and release of the input causes the avatar to stop. Also in one embodiment, the specific directional input is use of a displayed pointer to determine a destination point in the displayed virtual environment away from the first position, to which an avatar is to travel, while the camera position remains stationary, and wherein, upon the avatar reaching the determined destination point, the camera position teleports to at or near the new avatar position. Also in one embodiment, the pointer is curved in the display, concave downward relative to the z-axis in the virtual environment. And in one embodiment the pointer is straight in the display.

In one embodiment of the gaming platform, the curvature of the pointer is parabolic. Also in one embodiment, the control scripts are downloaded to the gaming platform prior to a game being selected at a network-connected gaming site. Also in one embodiment, the control scripts are provided to the VR platform at the time of connection to a gaming site, prior to game initiation. In one embodiment, the control scripts are streamed to the VR platform after game selection and initiation along with display data. And in one embodiment, the control scripts operate to control the avatar's movement to the second point.

In one embodiment of the gaming platform, the rate of movement of the avatar is alterable by a player using the platform. Also in one embodiment, the camera position teleports to the second position prior to the avatar reaching the second position. Also in one embodiment, the time duration, relative to the avatar's movement, that the camera position teleports, is adjustable by input. And in one embodiment, control scripts operate to allow a second destination point for the avatar to be selected before the avatar reaches the first destination point, providing for successive movement of the avatar, and associated movements of the camera position.

In another aspect of the invention, a virtual reality (VR) gaming method is provided, comprising displaying a virtual environment, including an avatar, in a display screen of a head-mounted display (HMD), to a player using the HMD at a VR platform, moving the avatar from a first position to a second position in the virtual environment by directional input from operating a three-axis input device coupled to the platform, and execution of dedicated control scripts on a processor of the VR platform, the scripts operable to leave the camera at the first position while the avatar moves, and teleporting the camera to at or near the second position in the virtual environment at a time that the avatar stops at the second position.

In one embodiment of the method, the directional input comprises operation of a thumbstick, joystick or button of a D-pad, as the three-axis input device, during which the avatar moves, and release of the input causes the avatar to stop. Also in one embodiment, the specific directional input is operation of a displayed pointer to determine a destination point as the second position in the virtual environment away from the first position, to which an avatar is to travel, while the camera position remains stationary, and wherein, upon the avatar reaching the second position, the camera position teleports to at or near the second position. Also in one embodiment, the pointer is curved in the display, concave downward relative to a z-axis in the virtual environment. In one embodiment the pointer is straight in the display. And in one embodiment, the curvature is parabolic.

In one embodiment of the method, the dedicated control scripts are downloaded to the gaming platform prior to a game being selected at a network-connected gaming site. Also in one embodiment, the dedicated control scripts are provided to the VR platform at the time of connection to a gaming site, prior to game initiation. Also in one embodiment, the dedicated control scripts are streamed to the VR platform after game selection and initiation along with display data. In one embodiment, the dedicated control scripts operate to control the avatar's movement to the second point. And in one embodiment, the rate of movement of the avatar is alterable by a player using the platform.

In one embodiment of the method, the camera position teleports to the second position prior to the avatar reaching the second position. Also in one embodiment, the time, relative to the avatar's movement, that the camera point teleports, is adjustable by input. And in one embodiment, the control scripts operate to allow a second destination point for the avatar to be selected before the avatar reaches the first destination point, providing for successive movement of the avatar, and associated movements of the camera position.

DETAILED DESCRIPTION OF THE INVENTION

In various embodiments described in enabling detail herein, the inventor provides a unique system and method for controlling motion of an avatar and an associated third person camera for a VR player. The present invention is described using the following examples, which may describe more than one relevant embodiment falling within the scope of the invention.

The inventors provide a virtual reality control scheme and method for controlling navigation of an Avatar in a three-dimensional game or environment that is comfortable for the VR player, and that creates a more equal playing field for other players using differing devices and controllers to operate their own Avatars in the same environment. The present invention is described in enabling detail using the following examples, which may describe more than one relevant embodiment falling within the scope of the present invention.

Figure 1:
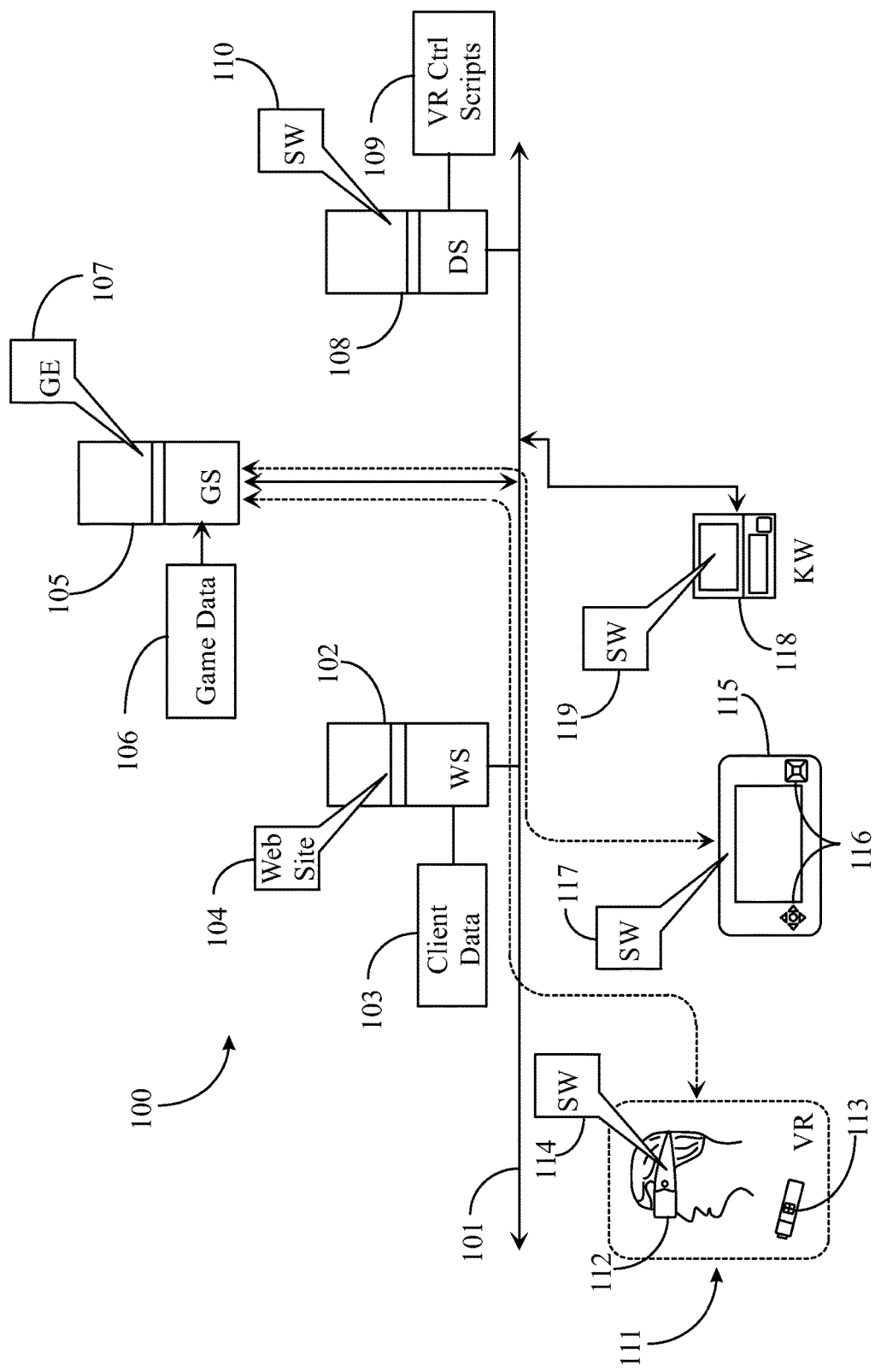
FIG. 1 is an architectural overview of a communications network over which virtual reality games may be played according to an embodiment of the present invention.

FIG. 1 is an architectural overview of a communications network 100 over which virtual reality sessions may be practiced according to an embodiment of the present invention. Communication network 100 includes the Internet network, represented herein by a network backbone 101. Internet backbone 101 includes all of the lines, equipment and access points that make up the Internet as a whole, including all connected sub-networks and carrier networks both wired and wireless. Carrier networks and sub-networks are not specifically illustrated in this embodiment, but may be assumed present such as would be in place for users to access the Internet.

Internet 101 support a Web server 102 executing software that provides a Website 104. Website 104 may be an access point for clients (players) of an Internet gaming site that supports virtual reality (VR) in the games or environments it has available to the clients. Web server 102 has connection to a data repository 103 containing client data including profile, membership data, billing, and other related data. In one embodiment users that are members of a gaming site may log into WS 104 and select games or environments from a selectable and searchable list, that provides links to the servers hosting the games. One such server is a game server 105 hosting a game engine (GE) 107. Game server 105 may be a cloud server that the gaming enterprise leases or otherwise maintains as an available server for playing games and navigating virtual environments. Game server 105 has connection to a data repository 106 that may contain game data and instruction for service.

It may be noted herein that a game provider may host games built by game developers, wherein the provider does not write the game code or modify any code that the developers have written relative to control schemes or platform/device support. However, it is possible that a game provider may seek to add players including VR players to their existing games in a fashion as to not create unequal quality of play for different players, and that the VR players have an optimum experience in an Avatar or character-based game or environment. By VR player is meant those players who are using VR platforms.

Internet 101 supports a design server (DS) 108 running software (SW) 110. SW 110 enables a game provider to make control schemes available for VR players that may join a game that was not designed specifically for VR but that supports VR in a way that is fair across the board for VR players and those not using VR equipment. In this example a knowledge worker (KW) is depicted using a computing device having connection to Internet backbone 101 via an Internet access line or network. Device 118 has software (SW) 119 executable thereon. SW 119 enables a knowledge worker or a developer to design and create alternative controller schemes for VR players that may play an Avatar-based game. Design server 108 has connection to a data repository 109 containing controller scripts designed by such as a KW operating from device 118 using SW 119. VR control scripts may be served to clients end devices to be prioritized over default schemes.

A VR client 111 is depicted in this example, and has access to Internet 101 via a line, sub network or carrier network, and appropriate Internet service provider. VR client 111 may, for example, have a 3-axis controller 113 and a head mounted display (HMD) 112, which together provide the VR experience to the user. The 3-axis remote controller may be an existing implement in VR such as a Daydream™ controller, a Vive™ controller, Oculus™ touch controller, etc. HMD 112 may be any HMD supporting VR such as Google Cardboard™, Oculus™ HMD, and so on.

HMD 112 may host a gaming application or software (SW) 114 for rendering a VR presentation accordingly. In one implementation controller 113 includes a virtual laser pointer function that is part of a camera-control script and avatar movement control method for directing navigation of the avatar in game by projecting a parabolic laser from the controller, visualized in a game, such that the end of the laser pointer intersects with a selected destination in the game for the avatar to travel to. User 111 may then push a button on HMD 112 or on controller 113 to initiate avatar travel to the destination marked by the end point of the laser. However, the camera does not follow the avatar but remains stationary during avatar motion, allowing the user to look about while the avatar is moving away and toward the destination along a calculated path. The camera may be teleported to the marked destination just before the avatar arrives at the destination.

A second user device 115 is depicted having connection to Internet 101 through a wireless carrier network (not shown). Device 115 is a gaming station running a gaming software (SW) 117. Device 115 has standard controller interfaces 116 to control avatar movement amongst other gaming functions. In this embodiment, user device 115 and 111 are in the same gaming session with server 105 and game engine 107 as depicted herein by two broken session lines connecting each device to GS 105 and GE 107. Both clients, as described, have different controllers for interacting with the game. In this embodiment, a game developer does not have to build or otherwise add any VR control scripts to game data 106 for game engine 107 for any games served. VR control scripts may be created in LUA, which is a very light-weight object-oriented program language. Other languages may also be used without departing from the spirit and scope of the present invention.

In general practice of the present invention, a developer may build a 3D game for general play from multiple disparate platforms. The game service hosting entity may create control schemes for VR support that may replace traditional teleporting schemes that may be VR defaults for a character or avatar to move. During a session, the hosting entity may detect a VR platform joining a game that supports VR alongside those not equipped with VR. The default scheme normally used by the VR player may be replaced in the game with the overriding camera and avatar control script that uses the parabolic or a straight laser to select a position for the avatar to move to in the game and wherein the camera remains stationary until the end of the avatar movement, and then teleports to the new 3D space just in time to allow the client to see the avatar moving into the new space. This might be accomplished in a few different ways, for example, making the control schema available to the VR client just before joining the game as a download ahead of the gaming stream. In one embodiment, the overriding control schema may be pre-selected by the VR client before playing.

In another embodiment, the overriding control schema may be inserted by proxy into the game stream and, based on detection of platform and peripheral input device, be prioritized over other schemes for other players. In one implementation, there may be more than one camera/avatar control schema for differing VR platforms without departing from the spirit and scope of the invention, wherein the device selects the appropriate schema based on the nature of the VR hardware used. For example, the laser parabola may emanate from the gaze point of a VR HMD like HMD 112 in the absence of a remote 3-axis controller for example. In this way, a VR player and a player not equipped with VR may play a same avatar-based game or environment or application on a more equal and competitive playing field, while the VR player does not experience discomfort through disassociation of the avatar camera from the HMD.

Figure 2:
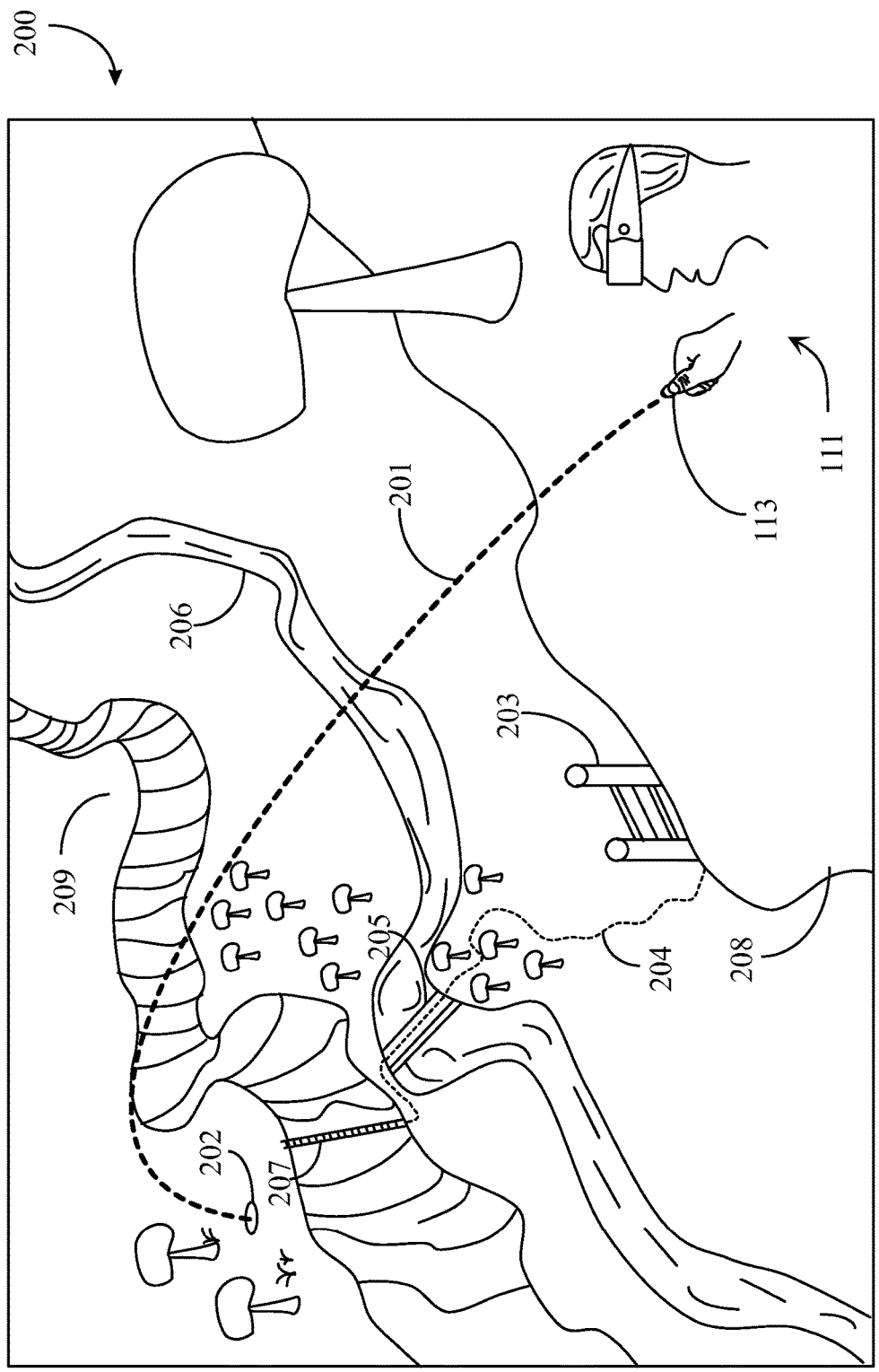
FIG. 2 is an example of a display for a game or world landscape supporting VR in an embodiment of the invention.

FIG. 2 is an example of a display 200 of a generated 3D landscape supporting VR player movement of avatar and camera in a comfortable manner for the VR player, according to an embodiment of the invention. In this example, the VR player 111 uses HMD 112, and controller 113 to move an avatar (not illustrated). In place of the avatar the user is depicted in game for discussion purposes only. Landscape view 200 is of a deep canyon with a river 206 flowing through it. The user (Avatar) is standing on the first cliff 208 and looking to move somewhere in the game landscape.

The user (111) may invoke a parabolic laser from remote device 113 to emanate parabola 201 which may intersect with a desired location in the landscape, in this case clifftop 209. The end of the laser pointer may be marked at a spot or circle 202 for travel by evoking a button on controller 113. Once the user has marked the spot 202, the user's avatar (not visible in this view) begins moving toward the destination circle 202. The movement may be walking, running, hopping, flying, or any other supported form of locomotion, other than teleporting. In one embodiment, the avatar may be in a vehicle like a helicopter, a car, etc. Exact configuration, car, boat, walking, running, etc. will depend partially on the on the landscape and partly on what the game developer has allowed in the game. In this example, an avatar controlled by user 111 will move from current position on clifftop 208 to spot or circle 202 on clifftop 209.

The game engine may calculate a viable path for the avatar to travel along from the previous avatar position in game (spot of user) to the other clifftop at location 202. In this example a travel path 204 (broken boundary line) includes a ladder 203 for climbing down off the first clifftop to the plain below and continues toward and across a bridge 205 and to a second ladder 207 that the avatar may use to climb up to clifftop 209 and move to spot 202.

During the travel operation, the camera that typically follows the avatar in motion is suspended from following the avatar, but the user may in $3^{rd}$ person still see the avatar moving and progressing along the calculated path to target 202. Just before the avatar gets to spot 202, the camera teleports to the spot just behind where the avatar will be standing at the end of the travel. The control scheme may use timing from game rules to determine how fast the avatar will travel, so a longer distance of travel in the game takes more time in a time-scaled fashion. The VR client may select another travel destination using the parabola before his or her avatar gets to the first destination. In this way, the user may keep the avatar continuously moving in game if desired. The VR player may also choose to look in other directions from where the avatar is traveling, and may direct the avatar to shoot or otherwise mask its travel if, for example, the movement is a retreat and the avatar is protecting itself while fleeing. Likewise, the time restriction on the travel to the destination means that the avatar is not necessarily safe in travel as another avatar may be chasing it, etc.

Figure 3:
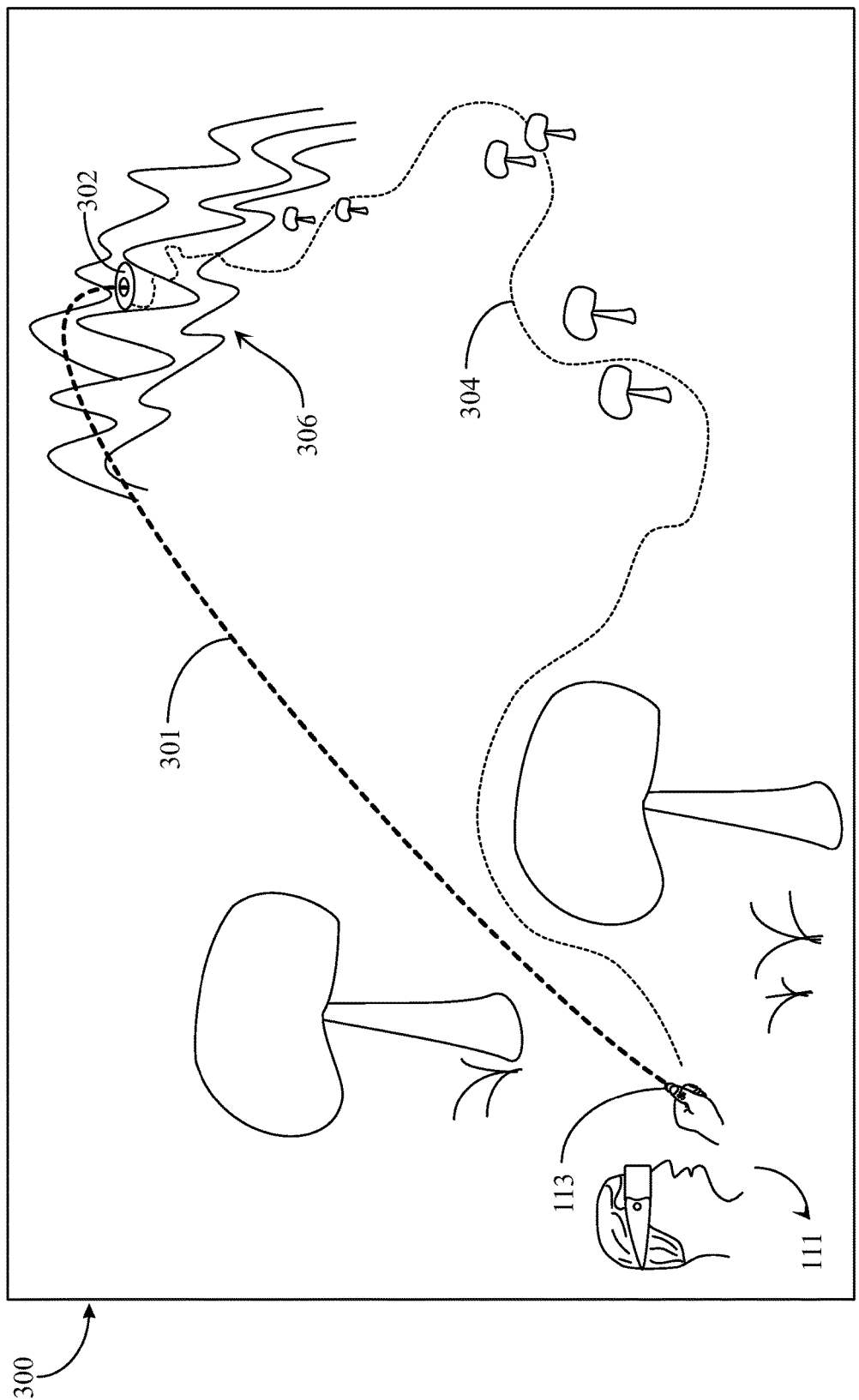
FIG. 3 is an example of a display of the landscape of FIG. 2 from a second position after a first movement of the avatar and teleport of an associated camera.

FIG. 3 is an example of a display 300 of the landscape of FIG. 2 from a second position after a first movement of avatar and teleport of an associated camera. In this view the avatar is standing on clifftop 209, spot 202 of FIG. 2 and looking toward another direction and another part of the landscape. User 111 with device 113 projects parabola pointer 301 into some mountains 306 at a place 302 in the middle of those mountains. The user's avatar will walk or run along calculated path 304 all of the way to spot 302 in the landscape.

In one embodiment, the calculated path is the shortest possible path from point A (position of the avatar) to point B, the avatar's destination. It is noted that in game the avatar is viewed on camera rather than the actual VR user. Once the avatar is near the very end of path 304, the camera may teleport to location 302 and may enable player view of the avatar moving on to the new position as more of the 3D landscape comes into view. Again, the player may view the avatar in motion with an exception if the avatar moves behind a wall or becomes not visible to the camera due to the path moving out of view of the camera position. In one embodiment, significant portions of an avatar path may be hidden, such as part of a path being in a tunnel for example. It may not be known to a player if in fact there is a complete path between the camera position and a destination selected for the avatar. The game system may inform if there is no complete path or the avatar may become stopped by an obstacle causing the camera to teleport to the avatar current position instead of to the destination. Many unique concepts in interaction might be envisioned without departing from the spirit and scope of the present invention.

In general interaction with the avatar in game play the player may click to walk or run to each successive destination tagged with the laser, by using the 3-axis controller. In one implementation where the user has a VR HMD but no 3-axis controller, the laser may be a straight laser that the user my initiate from his or her central gaze point in the HMD. A button on the display may be assigned to mark the spot and initiate the travel such as for Google cardboard, which as an input button on one side. The camera is prevented from trailing the avatar for the VR players in the game to avoid discomfort for the VR player. The timing associated with exactly when the camera will teleport is fine-tunable. This may allow for teleport of the camera about a half second before the avatar gets there. However, the camera may also teleport at the same time the avatar arrives or slightly after the avatar arrives at the marked place. The first option to teleport before the avatar arrives allows the user to invoke continuous motion of the avatar by selecting a second destination just as the camera gets there, but before the avatar arrives, and immediately begins on the next path to the next destination marked.

In an alternative embodiment, the operation of selecting a destination for the avatar by projection of a pointer in the display may be replaced by moving the avatar by signal of a thumbstick, a joystick, or a D-pad, depending on the implementation of the VR platform in use. In this embodiment, the player presses the thumbstick, for example, indicating a direction for the avatar to move, and while the thumbstick is pressed the engine calculates a path for the avatar, and moves the avatar along the path. But while the thumbstick (or other input) is pressed, the camera does not move. This operation is just as described above for use of a pointer, in the the camera does not move to a new position while the avatar is moving. When the player releases the thumbstick, the avatar stops, and the camera then teleports to the new avatar position.

The control scripts for VR may be selected when the system detects a VR platform joining the game, in which case the overriding control scheme (set of scripts) may be streamed to the user's end device when the user opens (joins) the game. There are also other available service options such as making a service call in the game sequence to a third-party service which knows the VR client and can stream the correct control scheme for the VR client at the onset of the game. In another option the client end device may obtain the game-relative schemes before joining a game, such as stored on the client platform and used whenever an avatar based game is played by the VR player.

Figure 4:
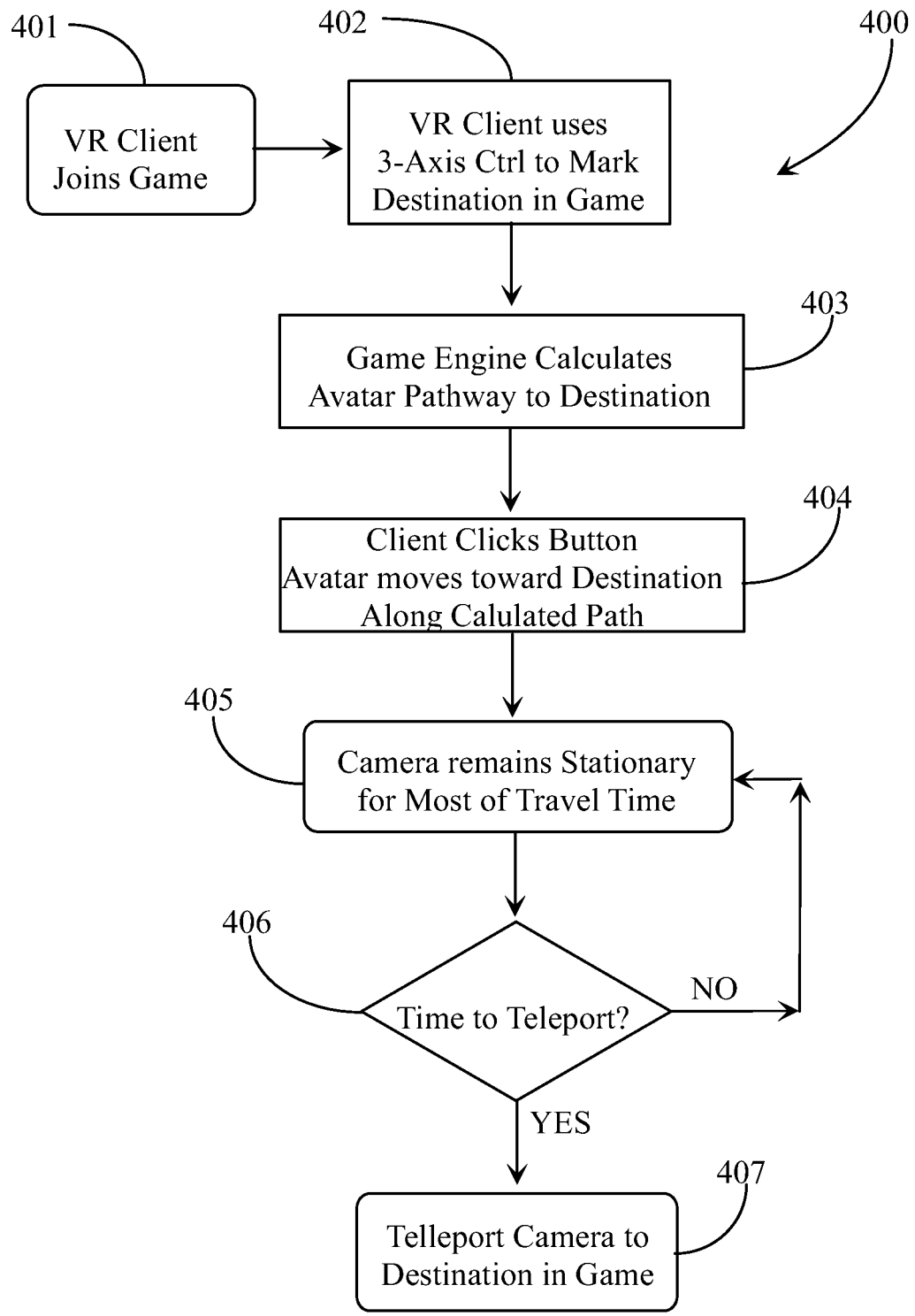
FIG. 4 is a process flow chart depicting steps for moving an avatar in a VR environment that may also be navigated by players not using VR components.

FIG. 4 is a process flow chart 400 depicting steps for moving an avatar in a VR environment that may also be navigated by players not using VR platforms. At step 401, a VR player joins a game. In this step the game is an avatar or character-based game. Also in this step, the VR player may receive a control scheme for camera and avatar movement in place of default controls for other types of end devices. In this example, it is assumed that the VR client has a 3-axis hand held controller and a head mounted display (HMD). However, a 3-axis hand-held controller is not absolutely required as it may be implemented in the HMD instead. At step 402, the client uses the 3-axis controller to mark a destination for avatar travel in the game. This step involves, in one embodiment, projecting a laser pointer in a parabolic shape from the current position to intersect with a desired spot or place in the landscape or architecture of the game, where the player desired the avatar to travel.

Alternatively, at step 402, the player presses a thumbstick, or other input associated with the VR platform, such as a joystick or buttons on a D-pad, and the avatar moves in the direction along a path calculated by the game engine.

At step 403, the game engine may calculate a viable path between the last camera position and the destination marked. This calculation may involve time and distance variables that might be used to calculate how long it will take the avatar to reach the selected destination over the travel path. In one embodiment, the system may calculate a shortest possible path between the camera position and the avatar's next destination in game.

At step 404 the client may click to send the avatar on to the marked destination along the path calculated. In one aspect of the method, a time constraint might be imposed on the laser such that holding the spot for a predetermined time sends the avatar automatically, without having to click a button. In another aspect, the client may click a button to lock the laser on a destination and send the avatar in the same step. In another aspect, the client may click two buttons, one to initiate the laser selection and one to send the avatar. Other options may be made available without departing from the spirit and scope of the present invention.

At step 405, the camera stays stationary in terms of forward travel with the avatar. The avatar moves but the camera that is mapped to the client HMD does not move with the avatar. The player may still look about while the avatar is moving toward a selected destination. The camera remains at the first position until the avatar is almost at the intended destination. At step 406, the system determines if it is time to teleport the camera. If at step 406 it is not time to teleport the camera, the process may resolve back to step 405. If the system determines it is time to teleport the camera, the camera is teleported at step 407. The camera, in this example, arrives just before the avatar arrives, allowing the player to see the avatar coming into frame.

In the alternative embodiment, wherein the avatar is moved by pressing a thumbstick or other directional input, the camera teleports to the new position of the avatar when the player releases the input.

The amount of time it takes the avatar to arrive at the destination may be a known variable before the avatar begins moving. The speed of the avatar and the mode (walk/run) are known, as well as the distance along the path to the destination spot selected by the pointer. Therefore, the time the avatar will arrive to the destination is precisely known. If it is allowed for the avatar to change speed along the way, the calculation automatically will take that into effect.

In one aspect, there may be a path-finding library that may be used to map or determine a path where the avatar may be out of sight of the player for some or most of the path. In one aspect, there may not be a 3-axis controller in step 402. The laser in some embodiments may also be a straight laser from the central gaze point of the user's HMD display. In another aspect, where there may be two 3-axis controllers, namely HMD and hand-held, the hand-held controller may be used to lock destination and move the avatar while the HMD may have a target point for a straight laser for firing a range-based weapon that can be used to shoot at infrastructure or at rivals while the avatar walks to a destination but before the camera teleports.

Figure 5:
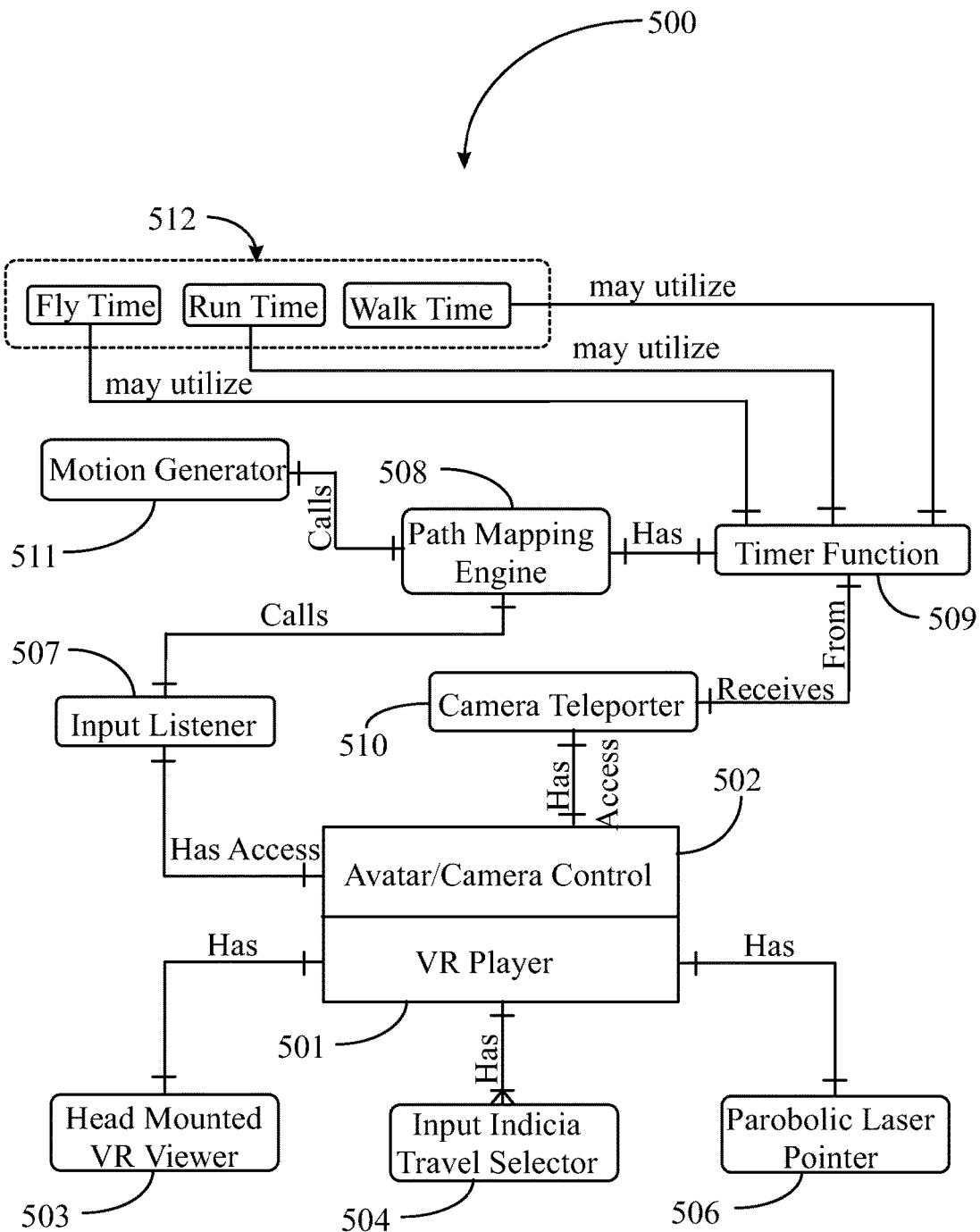
FIG. 5 is a UML diagram depicting a control scheme model for VR players in a game that also supports players not equipped with VR.

FIG. 5 is a UML diagram 500 depicting a control scheme model for VR players in a game that also supports players not equipped for VR. Diagram 500 depicts a control scheme model 502 specifically for a VR player 501. VR client 501 has a head-mounted VR viewer 503 such as an Oculus™ system or Google Cardboard™. VR player 501 has input control 504 such as a button or travel selector to initiate movement of an avatar. Input 504 may also be an attribute of VR viewer 503 or of laser pointer 506 (3-axis enabled) without departing from the spirit and scope of the present invention, such as on a Google Cardboard™ viewer or a hand-held 3-axis controller.

Avatar/camera control 502 has access in this example to an input detection or listener 507. Control 502 has a camera teleporter function 510 for teleporting an avatar camera just before an avatar arrives at a destination of travel. Input listener 507 may detect input from a VR player marking a destination for avatar travel, and call a path mapping engine 508 to determine the best possible path to take for the avatar from a path library. Paths may be previously mapped or identified and regulated by game code. In one embodiment, paths may be calculated in real time by path mapping engine 508.

Control 502 has access to a camera teleporter function 510 for enabling an avatar camera to remain stationary during avatar travel, and enabling the camera view to be teleported to a new space marked by the parabolic laser pointer. Camera teleporter function 510 receives information from a timer function 509 every time it teleports an avatar camera in game. Timer function 509 may calculate how much time it may take for an avatar to travel a path based on geographic distance (in game) and speed of avatar motion used by the player. Timer function 509 may utilize attribute data 512 for real time reporting to camera teleporter 510.

Attribute data 512 includes a fly speed for an avatar, a run speed for an avatar, and a walk speed for an avatar. These speeds may be standard in game constants and the number of options may depend upon avatar capabilities, and may also include swimming or other modes of locomotion such as driving. Further, each speed value may include more than one separate value, like slow run time and fast run time, etc. The timer function may apply these constants to the modes of locomotion used by the VR player, in one embodiment. For example, the player may mark a destination and initiate avatar travel toward that destination, whereby the player may determine to switch up the speed of travel, such as walk for part of the way then run the rest of the way. Therefore, in one implementation the timer may calculate total travel time for an avatar moving on a path toward a destination during the actual process, such that the teleporter receives input along the way and may teleport at the end of such time, or just before the avatar is set to arrive at the new destination.

The travel time may be a function of path distance and average speed of the avatar traveling the distance in real time. It should also be understood that an avatar may take more than one mode of travel along a calculated path, where the speeds of those modes may vary from one another in game, such as walking versus boating across a channel for example. An avatar may run part of the way and then float the rest of the way on a raft in an adjacent river that intersects or shares part of the path. There are many possibilities.

Path mapping engine 508 may also call a motion generator 511 (generating avatar motion) when confirmation of a path is made for a travel request to a marked destination. The total time calculated for an avatar completely traveling a path may be partly predicted using a predictive algorithm that may take into account current time traveled along a path to a certain known distance, and then offering a prediction for the rest of the distance. The teleporter 502 may be programed in this way dynamically such that even if the avatar reduced or increases velocity along a path, the teleportor continually has updated countdown values to work with at a granularity of 0.5 seconds more or less in some implementations.

It will be apparent to the skilled person the variations in FIG. 5 necessary to make FIG. 5 compatible with the alternative operation of moving the avatar by pressing a directional input, rather than by using a pointer to determine a new position for an avatar.

The present invention enables VR players to play a VR-supported Game on an equal playing field with other players in a manner that prevents the VR player from becoming uncomfortable using a HMD. It will be apparent to one with skill in the art that the system of the present invention may be practiced using all or a combination of components described in this specification. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will further be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A virtual reality (VR) gaming platform, comprising:
a head-mounted display (HMD);
software executing on a processor, controlling display of a virtual environment in the HMD and providing functions for network connectivity via a digital port;
a three-axis input device providing input to the processor; and
dedicated control scripts executable on the processor providing specific functions in moving an avatar and establishing camera position;
wherein the control scripts operate during game play to move the avatar from a first avatar position to a second avatar position in response to specific directional input from a player via the three-axis input device, the camera remains stationary while the avatar moves, the software tracks the movement of the avatar and calculates an expected time of arrival, and at a calculated time prior to the expected time of arrival, the camera position teleports to a second camera position near but not at the second avatar position, enabling the player, viewing from the second camera position, to see the avatar arrive at the second avatar position.

2. The VR gaming platform of claim 1 wherein the three-axis input device is one of a thumbstick, joystick or button of a D-pad.

3. The VR gaming platform of claim 1 wherein the specific directional input is use of a pointer displayed in the HMD to determine the second avatar position in the displayed virtual environment away from the first avatar position, to which the avatar is to travel, while the camera position remains stationary, and at a time prior to when the avatar stops moving at the second avatar position, the camera position teleports to a second camera position near but not at the second avatar position, enabling the player, viewing from the second camera position, to see the avatar arrive at the second avatar position.

4. The VR gaming platform of claim 3 wherein the pointer is curved in the display, concave downward relative to the z-axis in the virtual environment.

5. The VR gaming platform of claim 4 wherein the curvature is parabolic.

6. The VR gaming platform of claim 3 wherein the pointer is straight in the display.

7. The VR gaming platform of claim 1 wherein the control scripts are downloaded to the gaming platform prior to a game being selected at a network-connected gaming site.

8. The VR gaming platform of claim 1 wherein the control scripts are provided to the VR platform at the time of connection to a gaming site, prior to game initiation.

9. The VR gaming platform of claim 1 wherein the control scripts are streamed to the VR platform after game selection and initiation along with display data.

10. The VR gaming platform of claim 1 wherein the control scripts operate to control the avatar's movement to the second avatar position.

11. The VR gaming platform of claim 10 wherein the rate of movement of the avatar is alterable by a player using the platform.

12. The VR gaming method of claim 11 wherein the specific directional input is operation of a pointer displayed in the HMD to determine the second avatar position in the virtual environment away from the first avatar position, to which the avatar is to travel, while the camera position remains stationary, and at a time prior to when the avatar stops moving at the second avatar position, the camera position teleports to a second camera position near but not at the second avatar position, enabling the player, viewing from the second camera position, to see the avatar arrive at the second avatar position.

13. The VR gaming method of claim 12 wherein the pointer is curved in the display, concave downward relative to a z-axis in the virtual environment.

14. The VR gaming method of claim 13 wherein the curvature is parabolic.

15. The VR gaming method of claim 12 wherein the pointer is straight in the display.

16. The VR gaming platform of claim 1 wherein the time, relative to the avatar's movement, that the camera teleports prior to the avatar stopping at the second avatar position, is adjustable by input.

17. The VR gaming platform of claim 1 wherein the control scripts operate to enable the player to select a third avatar position before the avatar reaches the second avatar position, providing for successive movement of the avatar, and associated movements of the camera position.

18. A virtual reality (VR) gaming method, comprising:
displaying a virtual environment, including an avatar, on a display screen of a head-mounted display(HMD), to a player using the HMD at a VR platform;
moving the avatar from a first avatar position to a second avatar position in the virtual environment by directional input from operating a three-axis input device coupled to the platform, and execution of dedicated control scripts on a processor of the VR platform, the scripts operable to leave the camera at the first position while the avatar moves;
tracking movement of the avatar to the second avatar position and calculating an expected time of arrival; and
teleporting the camera to a second camera position near but not at the second avatar position in the virtual environment at a calculated time prior to when the avatar stops at the second avatar position, enabling the player, viewing from the second camera position, to see the avatar arrive at the second avatar position.

19. The VR gaming method of claim 18 wherein the three-axis input device comprises one of a thumbstick, joystick or a button of a D-pad.

20. The VR gaming method of claim 18 wherein the dedicated control scripts are downloaded to the gaming platform prior to a game being selected at a network-connected gaming site.

21. The VR gaming method of claim 18 wherein the dedicated control scripts are provided to the VR platform at the time of connection to a gaming site, prior to game initiation.

22. The VR gaming method of claim 18 wherein the dedicated control scripts are streamed to the VR platform after game selection and initiation along with display data.

23. The VR gaming method of claim 18 wherein the dedicated control scripts operate to control the avatar's movement to the second avatar position.

24. The VR gaming method of claim 23 wherein the rate of movement of the avatar is alterable by a player using the platform.

25. The VR gaming method of claim 18 wherein the time, relative to the avatar's movement, that the camera teleports, prior to the avatar stopping at the second avatar position, is adjustable by input.

26. The VR gaming method of claim 18 wherein the control scripts operate to enable the player to select a third avatar position before the avatar reaches the second avatar position, providing for successive movement of the avatar, and associated movements of the camera position.

* * * * *